(12) United States Patent
Kim

(10) Patent No.: US 9,511,712 B2
(45) Date of Patent: Dec. 6, 2016

(54) INSPECTING APPARATUS OF LANE DEPARTURE WARNING SYSTEM FOR VEHICLE

(71) Applicant: Hyundai Motor Company, Seoul (KR)

(72) Inventor: Sinkuk Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 210 days.

(21) Appl. No.: 14/549,891

(22) Filed: Nov. 21, 2014

(65) Prior Publication Data
US 2015/0145999 A1    May 28, 2015

(30) Foreign Application Priority Data

Nov. 22, 2013 (KR) .................. 10-2013-0143264

(51) Int. Cl.
*B60R 1/00* (2006.01)
*H04N 7/18* (2006.01)
*H04N 17/00* (2006.01)

(52) U.S. Cl.
CPC ............ *B60R 1/00* (2013.01); *H04N 17/002* (2013.01); *B60R 2300/402* (2013.01); *B60R 2300/804* (2013.01)

(58) Field of Classification Search
None
See application file for complete search history.

(56) References Cited

U.S. PATENT DOCUMENTS

| | | | | |
|---|---|---|---|---|
| 5,612,905 A * | 3/1997 | Maillart | ............ | G01B 11/2518 250/559.22 |
| 5,676,217 A * | 10/1997 | Torii | ............ | B60K 31/047 180/171 |
| 5,809,658 A * | 9/1998 | Jackson | ............ | G01B 11/2755 33/203.18 |
| 5,850,254 A * | 12/1998 | Takano | ............ | B60R 1/00 180/167 |
| 6,191,705 B1 * | 2/2001 | Oomen | ............ | G07B 15/063 235/384 |
| 6,714,156 B1 * | 3/2004 | Ibrahim | ............ | G01S 7/4026 342/165 |
| 7,121,011 B2 * | 10/2006 | Murray | ............ | G01B 11/272 33/203.18 |
| 7,424,387 B1 * | 9/2008 | Gill | ............ | G01B 11/272 33/288 |
| 8,781,731 B2 * | 7/2014 | Lo | ............ | B60R 1/00 382/104 |
| 8,896,687 B2 * | 11/2014 | Kataoka | ............ | G08G 1/167 348/118 |
| 9,041,806 B2 * | 5/2015 | Baur | ............ | B60R 1/00 340/903 |
| 9,056,630 B2 * | 6/2015 | Han | ............ | B62D 15/029 |

(Continued)

*Primary Examiner* — John R Olszewski
*Assistant Examiner* — Navid Ziaeianmedhizadeh
(74) *Attorney, Agent, or Firm* — Morgan, Lewis & Bockius LLP

(57) ABSTRACT

An inspection apparatus of a lane departure warning system for a vehicle may include an LDWS calibrate unit displaying a calibration target for calibrating a camera measurement point of the LDWS, a first moving unit mounted to a frame unit for moving the LDWS calibrate unit to a predetermined position, an LDWS inspection unit displaying lane images for inspecting normal operation of the LDWS, and a second moving unit mounted to the frame unit for moving the LDWS inspection unit to a predetermined position.

20 Claims, 6 Drawing Sheets

(56) References Cited

U.S. PATENT DOCUMENTS

| | | | |
|---|---|---|---|
| 9,080,866 B1* | 7/2015 | Dowdall | G01S 17/023 |
| 9,187,028 B2* | 11/2015 | Higgins-Luthman | B60Q 1/143 |
| 9,193,303 B2* | 11/2015 | Higgins-Luthman | B60R 1/00 |
| 2001/0048446 A1* | 12/2001 | Ishida | B60R 1/00 345/619 |
| 2002/0027651 A1* | 3/2002 | Jackson | G01B 11/2755 356/139.09 |
| 2002/0072869 A1* | 6/2002 | Stiller | G01C 21/26 702/90 |
| 2003/0065466 A1* | 4/2003 | Jackson | G01B 11/2755 702/94 |
| 2003/0225536 A1* | 12/2003 | Jackson | G01B 11/2755 702/94 |
| 2004/0016870 A1* | 1/2004 | Pawlicki | G06K 9/4604 250/208.1 |
| 2004/0178892 A1* | 9/2004 | Anderson | B60Q 1/2665 340/435 |
| 2006/0152711 A1* | 7/2006 | Dale | G01B 11/2755 356/139.09 |
| 2007/0164852 A1* | 7/2007 | Litkouhi | B60G 17/0195 340/435 |
| 2008/0055114 A1* | 3/2008 | Kim | B60R 1/00 340/937 |
| 2008/0231710 A1* | 9/2008 | Asari | H04N 17/002 348/187 |
| 2009/0179916 A1* | 7/2009 | Williams | G06T 7/0018 345/629 |
| 2010/0172542 A1* | 7/2010 | Stein | G06K 9/00798 382/103 |
| 2010/0179781 A1* | 7/2010 | Raphael | G06K 9/00791 702/94 |
| 2010/0194890 A1* | 8/2010 | Weller | B60R 1/12 348/148 |
| 2010/0238283 A1* | 9/2010 | Kim | G06T 7/0042 348/135 |
| 2010/0238291 A1* | 9/2010 | Pavlov | B60R 11/04 348/148 |
| 2010/0265325 A1* | 10/2010 | Lo | B62D 15/029 348/119 |
| 2011/0077900 A1* | 3/2011 | Corghi | G01B 11/2755 702/150 |
| 2011/0216194 A1* | 9/2011 | Kosaki | H04N 7/18 348/148 |
| 2012/0154588 A1* | 6/2012 | Kim | G06K 9/4633 348/148 |
| 2012/0320209 A1* | 12/2012 | Vico | B60R 1/00 348/148 |
| 2013/0027195 A1* | 1/2013 | Van Wiemeersch | B60W 30/12 340/431 |
| 2013/0070086 A1* | 3/2013 | Seifert | G01B 11/275 348/135 |
| 2013/0088382 A1* | 4/2013 | Lee | G01S 7/4026 342/174 |
| 2013/0135474 A1* | 5/2013 | Sakano | G06T 7/0018 348/148 |
| 2013/0239425 A1* | 9/2013 | Ham | G01B 5/24 33/533 |
| 2013/0321630 A1* | 12/2013 | Shin | G08G 1/167 348/148 |
| 2013/0325252 A1* | 12/2013 | Schommer | G01S 7/40 701/33.1 |
| 2014/0002656 A1* | 1/2014 | Woo | G08G 1/167 348/148 |
| 2014/0043473 A1* | 2/2014 | Gupta | G06T 7/0018 348/135 |
| 2014/0083161 A1* | 3/2014 | Pucnik | G01B 11/275 73/1.79 |
| 2014/0320658 A1* | 10/2014 | Pliefke | B60R 1/002 348/148 |
| 2014/0327765 A1* | 11/2014 | Hsien | G06T 7/0018 348/143 |
| 2014/0359994 A1* | 12/2014 | Park | B62D 65/005 29/407.05 |
| 2015/0341628 A1* | 11/2015 | Zeng | H04N 17/002 348/148 |
| 2015/0363934 A1* | 12/2015 | Ko | G01C 21/3602 701/431 |

* cited by examiner

INSPECTING APPARATUS OF LANE
DEPARTURE WARNING SYSTEM FOR
VEHICLE

CROSS-REFERENCE TO RELATED
APPLICATION

The present application claims priority to Korean Patent Application No. 10-2013-0143264 filed Nov. 22, 2013, the entire contents of which is incorporated herein for all purposes by this reference.

BACKGROUND OF THE INVENTION

Field of the Invention

The present invention relates to an inspection apparatus of a lane departure warning system for a vehicle. More particularly, the present invention relates to an inspection apparatus of a lane departure warning system for a vehicle which may inspect and calibrate a lane departure warning system mounted to a vehicle.

Description of Related Art

Recently, various kinds of vehicle driver assistance systems (DASs) have been equipped in vehicles to provide convenience and safety of driving to a driver while a vehicle is being driven.

The DASs helps drivers to keep a current driving lane, give alarms for lane departure, secure a safety distance from adjacent vehicles, prevent a collision with adjacent obstacles, and control speed depending on traffic situations or road conditions, etc. by utilizing various kinds of cameras, radar sensors, etc. without driver intervention.

These DASs have been generally applied to luxury vehicles, but recently, have been extensively applied even to compact and mid-size vehicles because interest in environmentally-friendly economical driving has increased to protect environment and conserve energy resources.

For example, the DASs may include systems such as a smart cruise control (SCC) system, a lane departure warning system (LDWS), a blind spot detection (BSD) system, an around view monitoring (AVM) system, etc.

The LDWS is mounted to an inner side of wind shield glass under a room mirror, detects a lane using a camera, and outputs warning signal to a driver when a vehicle departures from the lane.

Meanwhile, in a wheel alignment inspection process, a camera measurement point of the LDWS mounted to a vehicle is calibrated, and in an auto diagnosis system inspection process, normal operation of the LDWS is inspected.

Since the LDWS is installed at the inner side of the windshield glass under the rear view mirror (room mirror) of the vehicle, the camera measurement point of the LDWS in accordance with accumulated tolerance due to assembly of the windshield glass with respect to the vehicle body and assembly of the LDWS with respect to the windshield glass is calibrated in the wheel alignment inspection process.

And in the auto diagnosis system inspection process, whether the LDWS is normally operated to recognize a lane and sense departure from the lane using a camera and to warn to a driver and so on are inspected.

In calibrating the LDWS process, a target plate where a calibration target is printed is disposed at a front of the vehicle, and the camera measurement point of the LDWS with respect to the calibration target is calibrated. In inspection LDWS process, an inspection plate where lane images are printed moves left and right side at a front of the vehicle to inspect normal operation of the LDWS.

However, in a conventional art, the calibrating process and the inspection process are separately processed and thus an inspection cycle time increases and thus it is difficult to utilize inspection manpower and to control quality.

In addition, in the inspection process and the calibrating process of the LDWS, an inspection facility is exclusively manufactured for one type of vehicle, so the inspection facility should be modified or newly manufactured to be applicable to new types of vehicles, thereby requiring additional manpower and increased investment cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an inspection apparatus of a lane departure warning system for a vehicle having advantages of integrating separated inspection process and calibrating process into a single process and being applied to various types of vehicles.

According to various aspects of the present invention, an inspection apparatus of a lane departure warning system (LDWS) for a vehicle may include an LDWS calibrate unit displaying a calibration target for calibrating a camera measurement point of the LDWS, a first moving unit mounted to a frame unit for moving the LDWS calibrate unit to a predetermined position, an LDWS inspection unit displaying lane images for inspecting normal operation of the LDWS, and a second moving unit mounted to the frame unit for moving the LDWS inspection unit to a predetermined position.

The LDWS calibrate unit may include at least one first LCD monitor which displays the calibration target and is capable of adjusting an image position and an image size of the calibration target.

The frame unit may be a base frame supporting constituent elements and includes bracket and supporting blocks.

The first moving unit may include a first moving frame mounted to the frame unit and movable in front/rear directions with respect to the frame unit, a second moving frame mounted to the first moving frame and movable in up/down directions with respect to the first moving frame, and a third moving frame of which at least one first LCD monitor is mounted thereto, mounted to the second moving frame and movable with respect to the second moving frame.

The first moving frame may be movable with respect to the frame unit by operations of a first servo motor and a first lead screw, the second moving frame may be movable with respect to the first moving frame by operation of at least one up/down cylinder, and the third moving frame may be movable with respect to the second moving frame by operation of at least one left/right cylinder.

The first LCD monitor may be mounted to the third moving frame through a mounting bracket, and a fine adjustment unit may be provided to the third moving frame to move the mounting bracket to left/right and up/down directions for adjusting a position of the first LCD monitor.

The fine adjustment unit may include a mounting bracket movably mounted to the third moving frame to the left/right directions, and the mounting bracket may be movably mounted to the mounting bracket to the up/down directions.

The fine adjustment unit may include a first moving screw member rotatably mounted to the third moving frame and moving the mounting bracket to the left/right directions through a first manual handle, and a second moving screw member rotatably mounted to the mounting bracket and moving the mounting bracket to the up/down directions through a second manual handle.

The at least one first LCD monitor may be disposed as a pair, each first LCD monitor of the pair of first LCD monitors may be apart from each other, and each first LCD monitor may display the calibration target respectively.

The at least one first LCD monitor may be disposed as a pair, the each first LCD monitor of the pair of first LCD monitors may be apart from each other, each first LCD monitor may be movable according to operation of the first moving unit, and one first LCD monitor of the pair of first LCD monitors may display the calibration target.

The LDWS inspection unit may include a second LCD monitor which displays a lane as an inspection target and is capable of adjusting an image position and an image size of the lane image.

The second moving unit may include a forward/rearward moving member mounted to the frame unit and movable in front/rear directions with respect to the frame unit, and an up/down moving member of which the second LCD monitor is mounted thereto, guided by the forward/rearward moving member through a plurality of guide rods under the forward/rearward moving member, and movable in up/down directions.

Upper portions of the guide rod may be connected by a connecting bracket.

The forward/rearward moving member may be mounted to the frame unit and movable in the front/rear directions with respect to the frame unit by operations of a second servo motor and a second lead screw, and the up/down moving member may be movably mounted to the forward/rearward moving member to the up/down directions with respect to the forward/rearward moving member by operations of a third servo motor, a third lead screw and a belt.

The third servo motor may be fixed to an upper portion of the forward/rearward moving member, the third lead screw may be connected to the third servo motor and rotatably mounted to the upper portion of the forward/rearward moving member, a pair of moving bodies, each moving body separated from each other, may be engaged with the third lead screw, and the moving bodies may be movably mounted to the forward/rearward moving member to the front/rear directions with respect to the forward/rearward moving member, a fixing body may be fixed to an upper portion of the forward/rearward moving member corresponding to the moving bodies, and belt pulleys may be rotatably mounted to the moving bodies and the fixing body.

The moving bodies may be movable along a first guide rail mounted to the forward/rearward moving member.

The belt may be guided by the belt pulleys mounted to the moving bodies and the fixing body, and one end of the belt may be connected to the fixing body through a first fixing member, and another end of the belt may be connected to the up/down moving member through a second fixing member.

The inspection apparatus may further include a stopping unit which is disposed on the forward/rearward moving member movable to the front/rear directions for selectively limiting movement of the up/down moving member.

The stopping unit may include a stopping bar which is movable along a second guide rail disposed on the forward/rearward moving member and selectively limits movement of the connecting bracket.

The stopping bar may be disposed along an upward direction and of which an end selectively limits movement of the connecting bracket.

The inspection apparatus may further include a stopping cylinder disposed on the forward/rearward moving member for selectively moving the stopping bar to the front/rear directions.

The inspection apparatus of a lane departure warning system for a vehicle according to various embodiments of the present invention may integrate separated inspection process and calibrating process into a single process and be applied to various types of vehicles.

In addition, inspection apparatus of a lane departure warning system for a vehicle according to various embodiments of the present invention may reduce cycle time of the inspection process and the calibrating process of the LDWS, an inspection facility may be applied to new types of vehicles, thereby additional manpower and investment cost may be reduced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, terms such as "unit", "means", "part", "member", etc., which are described in the specification, mean a unit of a comprehensive configuration that performs at least one function or operation.

Figure 1:
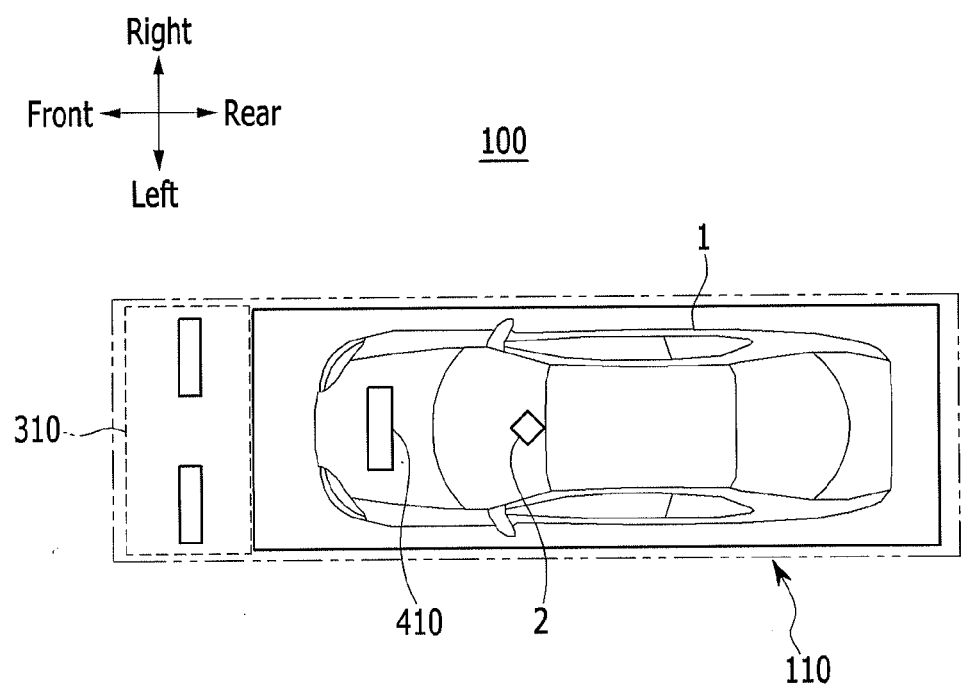
FIG. 1 is block diagram illustrating an exemplary inspection apparatus of a lane departure warning system for a vehicle according to the present invention.
Figure 2:
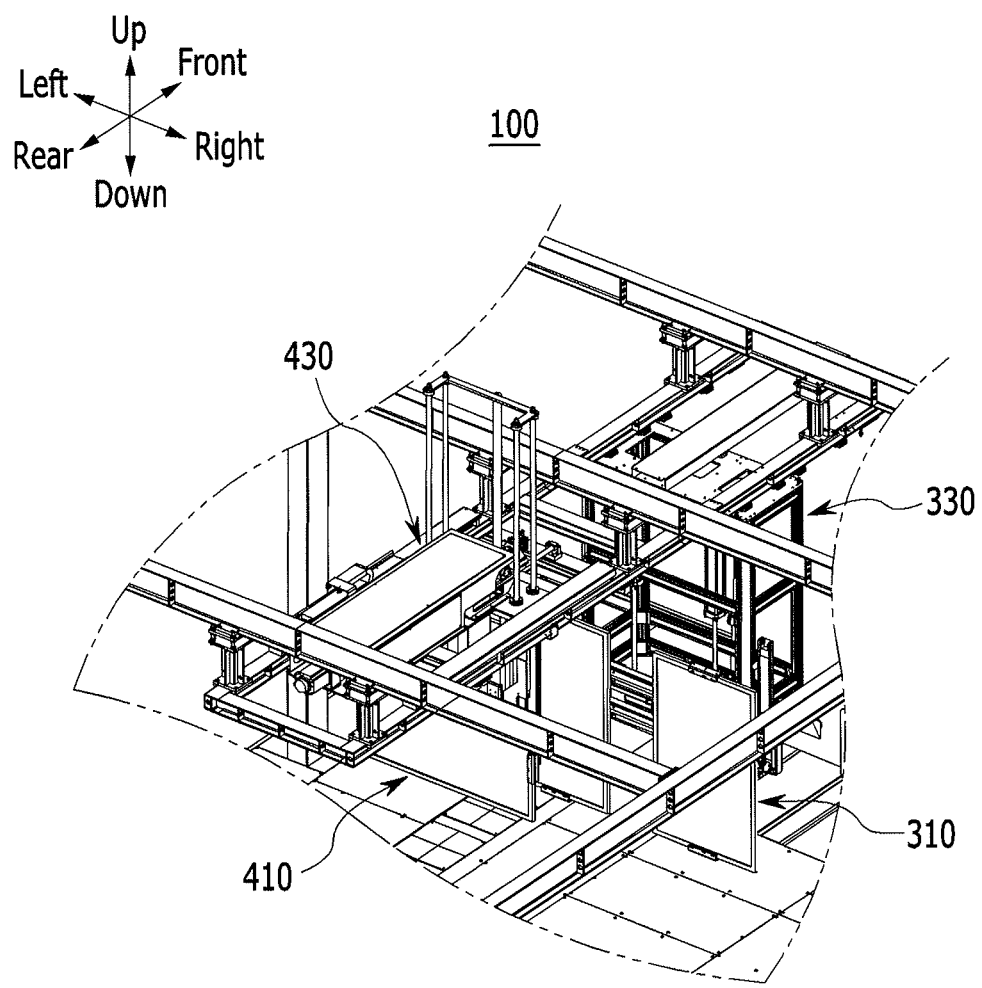
FIG. 2 is a perspective view of an exemplary inspection apparatus of the lane departure warning system for the vehicle according to the present invention.

FIG. 1 is block diagram illustrating an inspection apparatus of a lane departure warning system for a vehicle according to various embodiments of the present invention, and FIG. 2 is a perspective view of an inspection apparatus of a lane departure warning system for a vehicle according to various embodiments of the present invention.

Referring to FIG. 1 and FIG. 2, an inspection apparatus of a lane departure warning system for a vehicle 100 according to various embodiments of the present invention is applied to a process line of calibration and inspection for a Lane Departure Warning System (hereinafter it will be called as a LDWS)

The LDWS 2 is mounted to an inner side of wind shield glass under a room mirror of a vehicle (referring to FIG. 1) detects a lane and outputs warning signal to a driver when the vehicle 1 departs from the lane.

The scheme and the operation of the LDWS 2 are obvious to a person skilled in the art, and thus detailed description will be omitted.

Since the LDWS 2 is installed at the inner side of the windshield glass under the rear view mirror (room mirror) of the vehicle 1, the camera measurement point of the LDWS 2 in accordance with accumulated tolerance due to assembly of the windshield glass with respect to the vehicle 1 and assembly of the LDWS 2 with respect to the windshield glass should be calibrated and normal operation of the LDWS 2 should be inspected.

The inspection apparatus of a lane departure warning system for a vehicle according to various embodiments of the present invention may integrate separated inspection process and calibrating process into a single process and be applied to various types of vehicles.

The inspection apparatus 100 includes a LDWS calibrate unit 310, a first moving unit 330, a LDWS inspection unit 410 and a second moving unit 430.

In the related art, moving direction of the vehicle body is defined as "T direction", width direction of the vehicle body is defined as "L direction" and height direction of the vehicle body is defined as "H direction". However, in various embodiments of the present invention the description will be described according to the moving direction of the vehicle body or front/rear directions, the width direction or left/right directions and height direction or up/down directions of the vehicle body.

In various embodiments of the present invention, a frame unit 110 is a base frame supporting constituent elements and includes bracket, supporting blocks and so on.

And thus, in various embodiments, above elements will be basically called as the frame unit 110.

In various embodiments, the vehicle 1 may be various types of vehicles provided with the LDWS 2 front part thereof, and the vehicle 1 may be aligned to a predetermined position for precise calibrate/inspection processes.

The LDWS calibrate unit 310 is configured to calibrate a camera measurement point of the LDWS 2.

The LDWS 2 is installed at the inner side of the windshield glass under the rear view mirror of the vehicle 1, the camera measurement point of the LDWS 2 in accordance with accumulated tolerance due to assembly of the windshield glass with respect to the vehicle 1 and assembly of the LDWS 2 with respect to the windshield glass is calibrated using the LDWS calibrate unit 310.

The LDWS calibrate unit 310 corresponding to front side of the vehicle 1 is mounted to the frame unit 110 movable to multiple axis direction, and displays a virtual calibration target 323 (referring to FIG. 3) for calibrating a camera measurement point of the LDWS 2.

Figure 3:
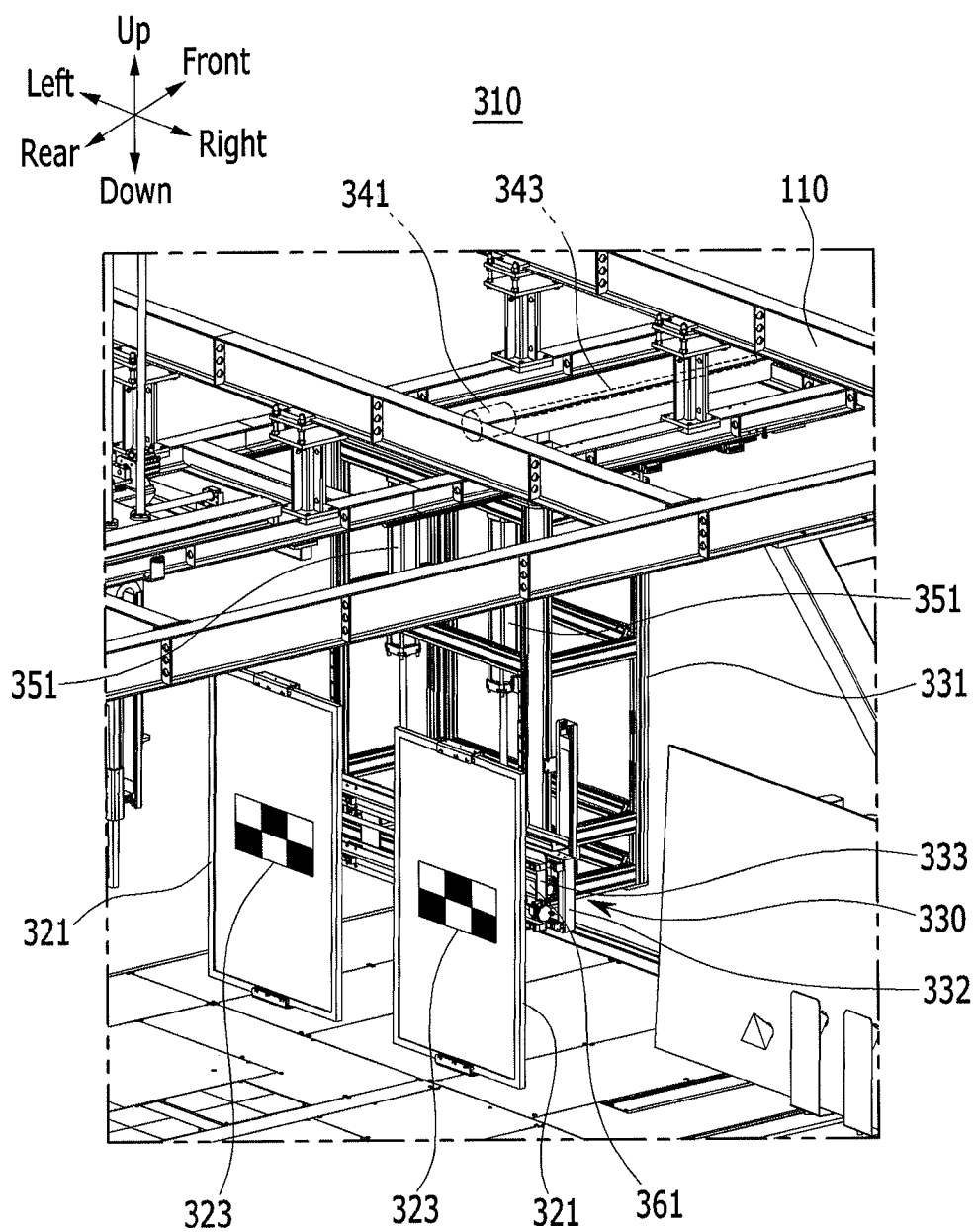
FIG. 3 and FIG. 4 are drawings showing a calibrate unit applied to the exemplary inspection apparatus of the lane departure warning system for the vehicle according to the present invention.
Figure 4:
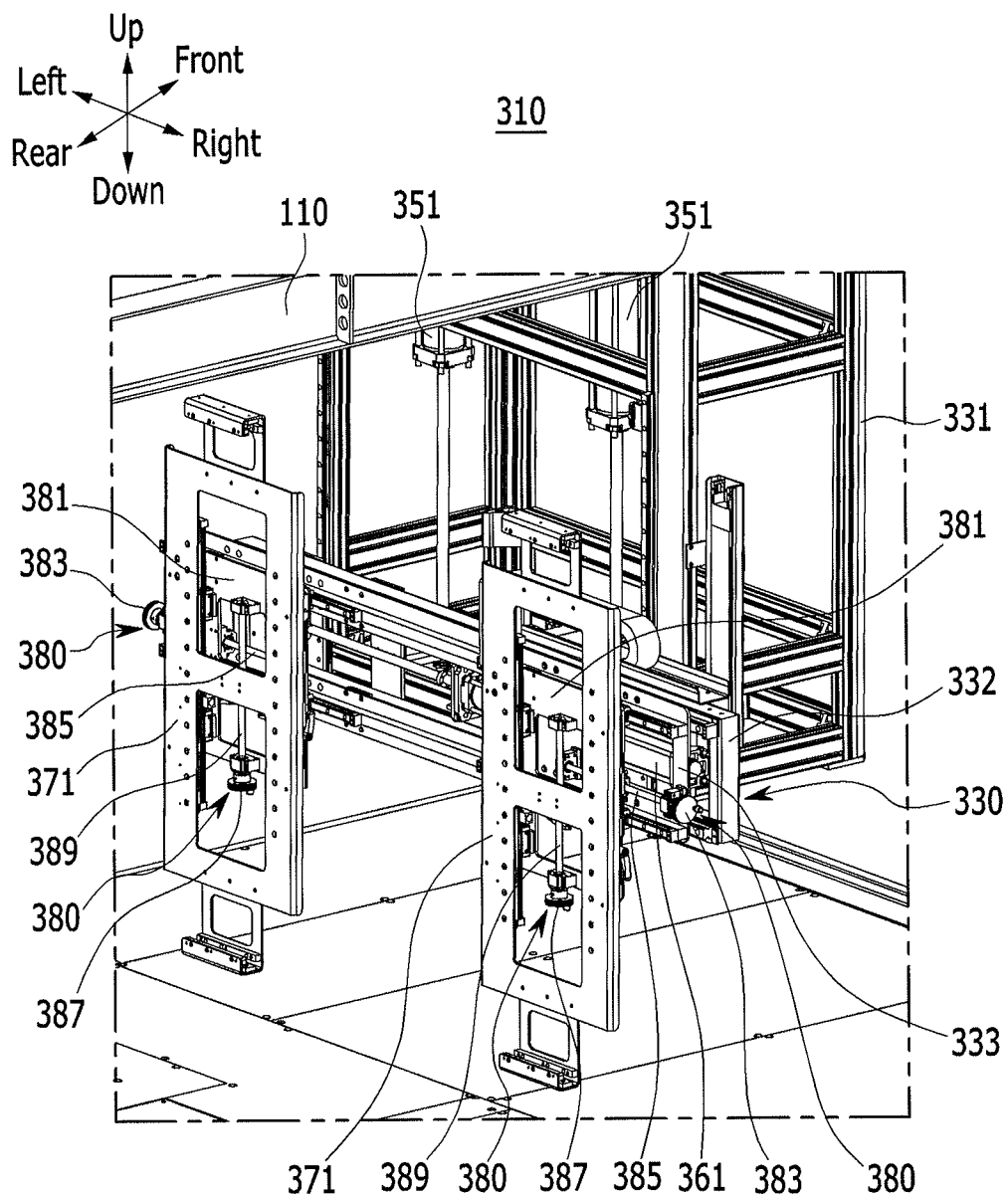

FIG. 3 and FIG. 4 are drawings showing a calibrate unit applied to an inspection apparatus of a lane departure warning system for a vehicle according to various embodiments of the present invention.

Referring to FIG. 3 and FIG. 4 the LDWS calibrate unit 310 includes a pair of first LCD monitors 321 mounted to the frame unit 110 and movable to a position corresponding to an aimer of a head lamp of the vehicle 1 by operations of the frame unit 110.

The first LCD monitor 321 displays the calibration target 323 as a calibrating image for the camera measurement point of the LDWS 2, and an image controller may adjust position and size of the calibration target 323.

The first LCD monitor 321 is movable to front/rear, left/right and up/down directions by the operation of the first moving unit 330 with respect to the frame unit 110. The first moving unit 330 includes a first moving frame 331, a second moving frame 332 and a third moving frame 333.

The first moving frame 331 is mounted to the frame unit 110 movable to front/rear directions through a guide unit or slide unit. The second moving frame 332 is mounted to the first moving frame 331 movable to up/down directions through a guide unit or slide unit. The third moving frame 333 is mounted to the second moving frame 332 movable to left/right directions through a guide unit or slide unit. The pair of first LCD monitors 321 are mounted to the third moving frame 333 apart from each other.

The first moving frame 331 is movable to front/rear directions with respect to the frame unit 110 by operations of a first servo motor 341 and a first lead screw 343. The first servo motor 341 is mounted to the frame unit 110. The first lead screw 343 is connected with a drive shaft of the first servo motor 341 and is rotatably disposed to the frame unit 110. The first lead screw 343 may be engaged with a block fixed to the first moving frame 331.

The second moving frame 332 is movable to up/down directions with respect to the first moving frame 331 by operation of a pair of up/down cylinders 351. The up/down cylinder 351 is disposed along up/down directions and mounted to the first moving frame 331. An operation rod of the up/down cylinder 351 is connected with the second moving frame 332.

The third moving frame 333 is movable to left/right directions with respect to the second moving frame 332 according to operations of the left/right cylinders 361. The left/right cylinders 361 are disposed along left/right directions and are mounted to the second moving frame 332. An operation rod of the left/right cylinder 361 is connected with the third moving frame 333.

The each first LCD monitor 321 is mounted to the third moving frame 333 through a mounting bracket 371 respectively, and a position of the first LCD monitor 321 with respect to third moving frame 333 may be adjusted by a fine adjustment unit 380.

The fine adjustment unit 380 includes a pair of mounting brackets 381 slidably mounted to the third moving frame 333 movable to left/right directions.

A mounting bracket 371 is mounted to the each mounting bracket 381 movable to up/down directions.

The fine adjustment unit 380 includes a moving device for moving the mounting bracket 381 to left/right directions and up/down directions.

The moving device moving the mounting bracket 381 to left/right directions includes a first moving screw member 385 which is rotatably mounted to the third moving frame 333 and moves the mounting bracket 381 to left/right directions according to rotation of a first manual handle 383. The first moving screw member 385 is engaged with the third moving frame 333.

The moving device moving the mounting bracket 381 to up/down directions includes a second moving screw member 389 which is rotatably mounted to the mounting bracket 381 and moves the mounting bracket 381 to up/down directions according to rotation of a second manual handle 387. The second moving screw member 389 is engaged with the mounting bracket 381.

At the state that the vehicle 1 is aligned to a predetermined position, the first LCD monitors 321 are positioned at the front of the aimer of head lamp of the vehicle 1 by the operation of the first moving unit 330.

Then, positions of the first LCD monitors 321 are precisely adjusted by operating the fine adjustment unit 380, for example manually.

The first LCD monitors 321 display the calibration targets 323 for calibration of the camera measurement point of the LDWS 2 adjust image positions and sizes of the calibration targets 323 as two calibration types through the image controller.

In various embodiments, one first LCD monitor 321 may be used as a single calibration target type, the camera measurement point of the LDWS 2 may be corrected.

For this purpose, in a state where the pair of first LCD monitors 321 are moved in the left or right direction, the single correction target 323 with respect to the LDWS 2 may be displayed only on one of the first LCD monitors 321.

In various embodiments of the present invention, using the calibration target 323 displayed on the V of the LDWS calibrate unit 310, the camera measurement point of the LDWS 2 may be calibrated.

Referring to FIG. 1 and FIG. 2, in various embodiments of the present invention, the LDWS inspection unit 410 inspects normal operation of LDWS 2.

The LDWS inspection unit 410 is configured to check if alarm sounds or alarm displays are appropriately provided to the driver while normally recognizing a driving lane and detecting lane departure of the vehicle 1 through the camera of the LDWS 2.

The LDWS inspection unit 410 is installed to the frame unit 110 such that it is reciprocally movable in accordance with the front side of the vehicle 1 in multi-axis directions, and displays a virtual lane 411 with respect to the camera of the LDWS 2 as images.

Figure 5:
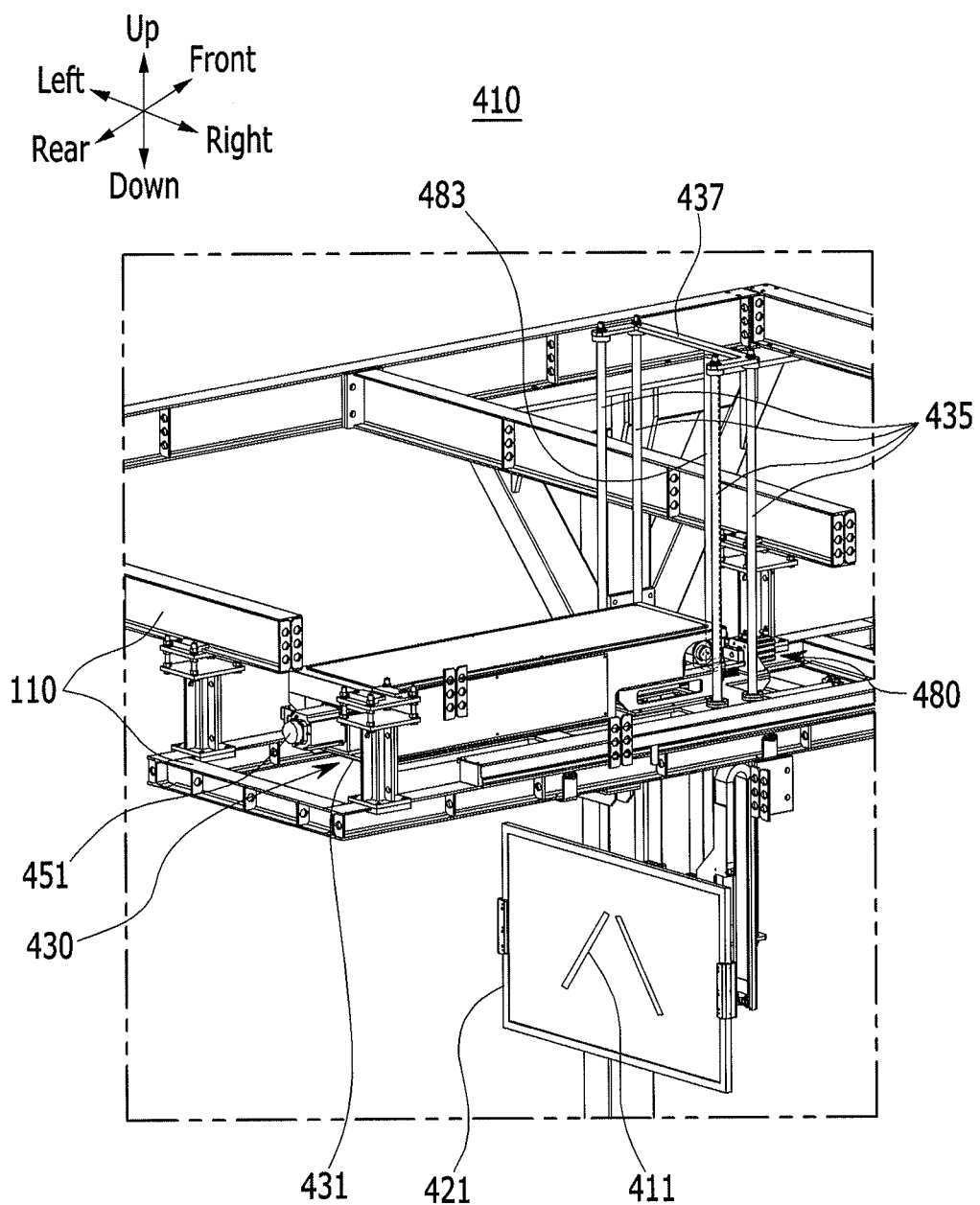
FIG. 5, FIG. 6A and FIG. 6B are drawings showing an inspection unit applied to the exemplary inspection apparatus of the lane departure warning system for the vehicle according to the present invention.
Figure 6A:
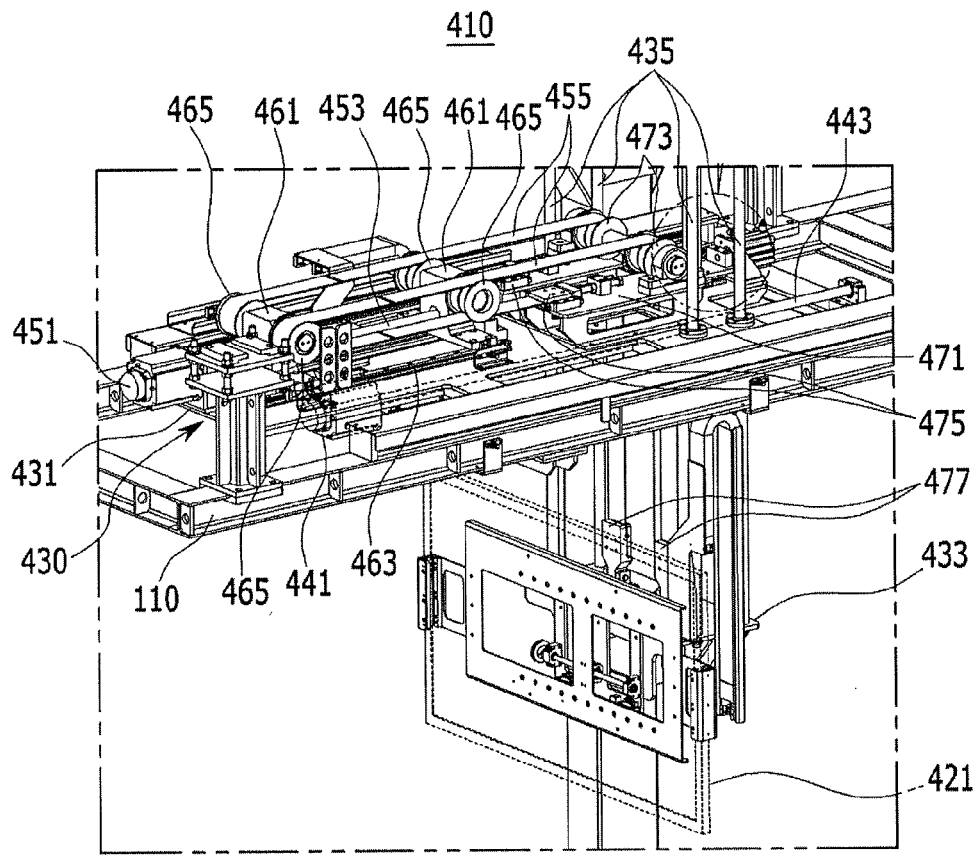
Figure 6B:
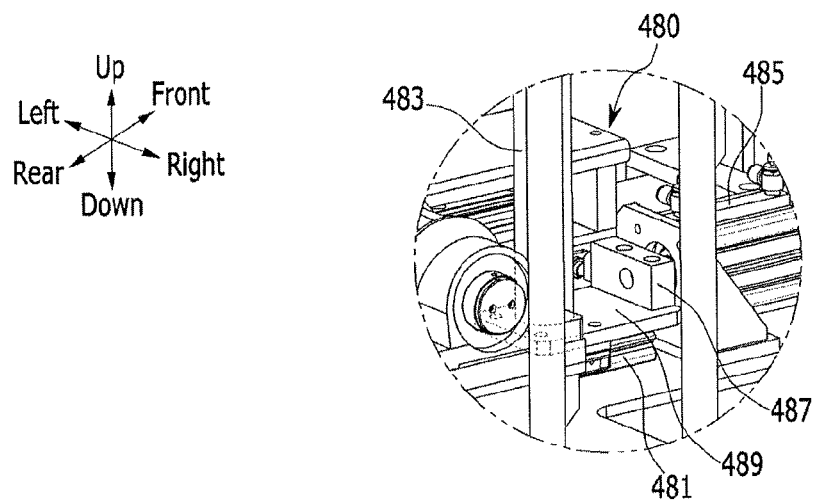

FIG. 5, FIG. 6A and FIG. 6B are drawings showing an inspection unit applied to an inspection apparatus of a lane departure warning system for a vehicle according to various embodiments of the present invention.

Referring to FIG. 5, FIG. 6A and FIG. 6B, the LDWS inspection unit 410 includes a second LCD monitor 421, which is installed to frame unit 110 such that it is movable in accordance with the front side of the vehicle 1 in the front/rear and the up/down directions according to the predetermined position of the vehicle 1.

The second LCD monitor 421 visualizes and displays the driving lane 411, which is an inspection target for inspecting the normal operation of the LDWS 2, and may adjust position and size of the driving lane 411 using the image controller of the disclosed technology.

In this case, the second LCD monitor 421 may adjust the image of the lane 411 in the left/right and the up/down directions using the image controller. In this case, the second LCD monitor 421 may be installed such that it is reciprocally moved in the front/rear and the up/down directions with respect to the frame unit 110 by a second moving unit 430.

The second moving unit 430 includes a forward/rearward moving member 431 and an up/down moving member 433. The forward/rearward moving member 431 has a plate shape, and is provided such that it is slidingly moveable with respect to the frame unit 110 in the front/rear directions through the guiding apparatus or sliding apparatus.

The up/down moving member 433 is guided by a plurality of guide rods 435 to the forward/rearward moving member 431 and is installed such that it is reciprocally movable in the up/down directions.

The guide rods 435 penetrate the forward/rearward moving member 431 in the up/down directions, and may be coupled to the up/down moving member 433. In this case, the second LCD monitor 421 is installed to up/down moving member 433.

Upper end portions of the guide rods 435 may be coupled to each other through a connecting bracket 437.

Meanwhile, the forward/rearward moving member 431 may be moved in the front/rear directions with respect to the frame unit 110 by a servo motor 441 and a lead screw 443. The second servo motor 441 is mounted to the frame unit 110.

The second lead screw 443 is disposed in the frame unit 110 along the front/rear directions and is connected with a driving shaft of the servo motor 441, and is installed such that it is rotatable with respect to the frame unit 110 through bearings. In this case, the lead screw 443 is engaged with a separate block that is fixed to the forward/rearward moving member 431.

The up/down moving member 433 may be reciprocally moved in the up/down directions with respect to the forward/rearward moving member 431 by a servo motor 451, a lead screw 453, and belts 455.

The third servo motor 451 is mounted on the forward/rearward moving member 431. The lead screw 453 is connected with the driving shaft of the servo motor 451 along the front/rear directions, and the lead screw 453 is disposed on the forward/backward moving member 431 such that it is rotatable through bearings and the like.

A pair of moving bodies 461, separated from each other, are engaged with the third lead screw 453, and the moving bodies 461 are movably mounted to a first guide rail 463 disposed on the forward/rearward moving member 431 to front/rear directions. A pair of belt pulleys 465 are rotatably mounted to each moving body 461.

A fixing body 471 is fixed to an upper portion of the forward/rearward moving member 431 corresponding to the moving bodies 461. A pair of belt pulley 473 are rotatably mounted to each moving body 461.

The belts 455 are provided to move the second LCD monitor 421 mounted to the up/down moving member 433 in the up/down directions, and are coupled as a pair to be guided by the belt pulleys 465 and 473 of the moving bodies 461 and the fixing body 471.

One end of the belt 455 is connected to the fixing body 471 through a first fixing member 475, and the other end of the belt 455 is connected to the up/down moving member 433 through a second fixing member 477.

As the second LCD monitor 421 installed to the up/down moving member 433 is moved in the up/down directions by the belt 455, the second LCD monitor 421 may fall down along with the up/down moving member 433 due to separation of the up/down moving member 433 from the belt 455.

In order to prevent this, in various embodiments of the present invention, a stopping unit 480 is further included to restrict (stop) the up/down moving member 433 when the upward/downward movement of the second LCD monitor 421 is completed by the belt 455.

The stopping unit 480 includes a stopping bar 483, which is movable along a second guide rail 481 disposed on the forward/rearward moving member 431.

The stopping bar 483 selectively limits movement of the connecting bracket 437 that connects the upper end portions of the guide rods 435.

The stopping bar 483 may be moved along the guide rail 481 in the front/rear directions by a stopping cylinder 485, which is fixedly installed on the forward/rearward moving member 431. Thus, the stopping bar 483 may or may not restrict movement of the connecting bracket 437 through its upper end portion.

That is, a connection block 487 is connected with an operating rod of the stopping cylinder 485, and the connection block 487 is coupled to a flange 489 of the lower end portion of the stopping bar 483. Thus, the stopping cylinder 485 may move its operating rod in the front/rear directions so as to move the stopping bar 483 in the front/rear directions along the guide rail 481. When the stopping bar 483 is positioned under the connecting bracket 487, movement to downward of the connecting bracket 487 may be restricted.

Hereinafter, referring to the drawings, operations of the inspection apparatus 100 according to various embodiments of the present invention will be discussed in detail.

First, in various embodiments of the present invention, a completed vehicle 1 in which various kinds of parts are assembled in a vehicle assembly process is carried to the vehicle inspection line. In the vehicle inspection line, the camera measurement point of the LDWS 2 is calibrated and operations LDWS 2 mounted on the completed vehicle 1 are inspected.

The vehicle 1 may be aligned for inspection and calibration processes by an align apparatus.

After aligning of the vehicle 1, the first LCD monitor 321 of the LDWS calibrate unit 310 is moved in the front/rear, the left/right, and the up/down directions according to the predetermined position of the vehicle 1 by the first moving unit 330 in accordance with an upper end of a head lamp aimer of the vehicle 1.

In detail, the first moving frame 331 is moved to front/rear directions with respect to the frame unit 110 according to the operations of the first servo motor 341 and the first lead screw 343.

The second moving frame 332 is moved to up/down directions with respect to the first moving frame 331 according to the operations of the up/down cylinders 351, and the third moving frame 333 is moved to left/right directions with respect to the second moving frame 332 according to the operations of the left/right cylinders 361.

Then the first LCD monitor 321 mounted to the third moving frame 333 is moved to front/rear, left/right and up/down directions to be positioned at a predetermined position.

Further, in various embodiments of the present invention, the first LCD monitors 321 may be manually moved in the left/right and the up/down directions by the fine adjustment unit 380 such that positions of the first LCD monitors 321 are minutely adjusted.

In detail, the first manual handle 383 is rotated, then the first moving screw member 385 is rotated to move the mounting bracket 381 to left/right directions, and thus the position of the first LCD monitor 321, mounted to the mounting bracket 381 through the mounting bracket 371, is precisely adjusted to left/right directions.

When the second manual handle 387 is rotated, then the second moving screw member 389 is rotated to move the mounting bracket 381 to up/down directions, and thus the position of the first LCD monitor 321 is precisely adjusted to up/down directions.

As such, while the first LCD monitors 321 are automatically moved by the first moving unit 330 in the front/rear, the left/right, and the up/down directions and the positions of the first LCD monitor 321 are minutely adjusted by the fine adjustment unit 380 in accordance with the predetermined position of the vehicle 1, in the various embodiments of the present invention, the respective first LCD monitors 321 display the virtual calibration target 323 as images.

That is, the respective first LCD monitors 321 respectively regenerate a single calibration target 323 as the images, and adjust image positions and sizes of the calibration targets 323 as two calibration types through the image controller.

Thus, by using the virtual calibration targets 323 that are displayed through the respective first LCD monitors 321, the camera measurement point of the LDWS 2 may be corrected in accordance with accumulated tolerance due to assembly of the windshield glass with respect to the vehicle body and assembly of the LDWS 2 with respect to the windshield glass.

Meanwhile, in various embodiments of the present invention, by using one first LCD monitor 321, as a single correction target type, the camera measurement point of the LDWS 2 may be calibrated.

For this purpose, while the pair of first LCD monitors 321 are moved in the left or right direction by the first moving unit 330, the single calibration target 323 with respect to the LDWS 2 may be displayed on any one of the first LCD monitors 321.

As such, in a state where the camera measurement point of the LDWS 2 is corrected by the first LCD monitor 321 of the LDWS calibrate unit 310, the first LCD monitor 321 of the LDWS calibrate unit 310 is restored to its original position.

Meanwhile, as described above, in a state where the camera measurement point of the LDWS 2 is calibrated by the first LCD monitor 321 of the LDWS calibrate unit 310, the second LCD monitor 421 of the LDWS inspection unit 410 is moved in the front/rear and up/down directions by the second moving unit 430 according to the predetermined position of the vehicle 1.

In detail, the forward/rearward moving member 431 is moved to front/rear directions with respect to the frame unit 110 according to the operations of the second servo motor 441 and the second lead screw 443.

Also, the up/down moving member 433 is moved to up/down directions with respect to the forward/rearward moving member 431 according to the operations of the third servo motor 451, the third lead screw 453 and the belt 455.

When the third lead screw 453 is rotated by the operation of the third servo motor 451, the moving bodies 461 are moved to front/rear directions along the first guide rail 463.

The belts 455 are guided by the belt pulleys 465 and 473 of the moving bodies 461 and the fixing body 471. In this case, one end of the belt 455 is connected with the fixing body 471 and the other end of the belt 455 is connected with the up/down moving member 433.

When the moving body 461 is moved to front/rear directions by the operations of the third servo motor 451 and the third lead screw 453, the up/down moving member 433 is moved to up/down direction in accordance with weight of the second LCD monitor 421.

In a state that the up/down moving member 433 is guided by the forward/rearward moving member 431 through the guide rods 435, the up/down moving member 433 is moved to up/down directions.

Thus, the second LCD monitor 421 mounted to the up/down moving member 433 is positioned at a determined position with respect to the vehicle 1.

In this state, the upper end of the stopping bar 483 of the stopping unit 480 is positioned apart from the connecting bracket 437 connecting the guide rods 435.

After moving the second LCD monitor 421 to up/down directions according to the operation of the second moving unit 430, movement of the up/down moving member 433 may be restricted by the stopping unit 480.

When the stopping cylinder 485 pushes the stopping bar 483 to move forward, the upper end of the stopping bar 483 is positioned under the connecting bracket 437 to restrict movement of the connecting bracket 437.

Since the stopping bar 483 restricting the movement of the up/down moving member 433, even if the up/down moving member 433 is separated from the belt 455, the up/down moving member 433 may not fall down together with the second LCD monitor 421.

After positioning the second LCD monitor 421 corresponding to the vehicle 1 to a predetermined position, the second LCD monitor 421 displays the virtual lane 411 as the inspection target.

The second LCD monitor 421 visualizes and displays the driving lane 411, which is an inspection target for inspecting the normal operation of the LDWS 2, and may adjust position and size of the driving lane 411 using the image controller of the disclosed technology.

In this process, whether the LDWS 2 normally detects the virtual driving lane 411 using the camera, normally determines departure from the lane of the vehicle, and normally outputs signals, for example warning sound or warning display and so on are inspected.

The inspection apparatus of a lane departure warning system for a vehicle according to various embodiments of the present invention may integrate separated inspection process and calibrating process into a single process and be applied to various types of vehicles.

In addition, inspection apparatus of a lane departure warning system for a vehicle according to various embodiments of the present invention may reduce cycle time of the inspection process and the calibrating process of the LDWS, an inspection facility may be applied to new types of vehicles, thereby additional manpower and investment cost may be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inspection apparatus of a lane departure warning system (LDWS) for a vehicle comprising:
    an LDWS calibrate unit displaying a calibration target for calibrating a camera measurement point of the LDWS;
    a first moving unit mounted to a frame unit for moving the LDWS calibrate unit to a first predetermined position;
    an LDWS inspection unit displaying lane images for inspecting normal operation of the LDWS; and
    a second moving unit mounted to the frame unit for moving the LDWS inspection unit to a second predetermined position.

2. The inspection apparatus of claim 1,
    wherein the LDWS calibrate unit comprises at least one first LCD monitor which displays the calibration target and is configured for adjusting an image position and an image size of the calibration target, and
    wherein the frame unit is a base frame supporting constituent elements and includes bracket and supporting blocks.

3. The inspection apparatus of claim 2, wherein the first moving unit comprises:
    a first moving frame mounted to the frame unit and movable in front and rear directions with respect to the frame unit;
    a second moving frame mounted to the first moving frame and movable in up and down directions with respect to the first moving frame; and
    a third moving frame of which at least one first LCD monitor is mounted thereto, mounted to the second moving frame and movable with respect to the second moving frame.

4. The inspection apparatus of claim 3, wherein:
    the first moving frame is movable with respect to the frame unit by operations of a first servo motor and a first lead screw,
    the second moving frame is movable with respect to the first moving frame by operation of at least one of up and down cylinders, and
    the third moving frame is movable with respect to the second moving frame by operation of at least one left and right cylinder.

5. The inspection apparatus of claim 3, wherein:
    the first LCD monitor is mounted to the third moving frame through a mounting bracket, and
    a fine adjustment unit is provided to the third moving frame to move the mounting bracket to left and right and up and down directions for adjusting a position of the first LCD monitor.

6. The inspection apparatus of claim 5, wherein:
the fine adjustment unit comprises a mounting bracket movably mounted to the third moving frame to the left and right directions; and
the mounting bracket is movably mounted to the mounting bracket to the up and down directions.

7. The inspection apparatus of claim 6, wherein the fine adjustment unit comprises:
a first moving screw member rotatably mounted to the third moving frame and moving the mounting bracket to the left and right directions through a first manual handle; and
a second moving screw member rotatably mounted to the mounting bracket and moving the mounting bracket to the up and down directions through a second manual handle.

8. The inspection apparatus of claim 2, wherein the at least one first LCD monitor is disposed as a pair, each first LCD monitor of the pair of first LCD monitors is apart from each other, and each first LCD monitor displays the calibration target respectively.

9. The inspection apparatus of claim 2, wherein the at least one first LCD monitor is disposed as a pair, each first LCD monitor of the pair of LCD monitors is apart from each other, each first LCD monitor is movable according to operation of the first moving unit, and one first LCD monitor of the pair of first LCD monitors displays the calibration target.

10. The inspection apparatus of claim 1, wherein the LDWS inspection unit comprises a second LCD monitor which displays a lane as an inspection target and is configured for adjusting an image position and an image size of the lane image.

11. The inspection apparatus of claim 10, wherein the second moving unit comprises:
a forward and rearward moving member mounted to the frame unit and movable in front and rear directions with respect to the frame unit; and
an up and down moving member of which the second LCD monitor is mounted thereto, guided by the forward and rearward moving member through a plurality of guide rods under the forward and rearward moving member, and movable in up and down directions.

12. The inspection apparatus of claim 11, wherein upper portions of the guide rods are connected by a connecting bracket.

13. The inspection apparatus of claim 11, wherein:
the forward and rearward moving member is mounted to the frame unit and movable in the front and rear directions with respect to the frame unit by operations of a second servo motor and a second lead screw, and the up and down moving member is movably mounted to the forward and rearward moving member to the up and down directions with respect to the forward and rearward moving member by operations of a third servo motor, a third lead screw and a belt.

14. The inspection apparatus of claim 13, wherein:
the third servo motor is fixed to an upper portion of the forward and rearward moving member,
the third lead screw is connected to the third servo motor and rotatably mounted to the upper portion of the forward and rearward moving member;
a pair of moving bodies, each moving body separated from each other, are engaged with the third lead screw, and the moving bodies are movably mounted to the forward and rearward moving member to the front and rear directions with respect to the forward and rearward moving member,
a fixing body is fixed to an upper portion of the forward and rearward moving member corresponding to the moving bodies, and
belt pulleys are rotatably mounted to the moving bodies and the fixing body.

15. The inspection apparatus of claim 14, wherein the moving bodies are movable along a first guide rail mounted to the forward and rearward moving member.

16. The inspection apparatus of claim 14, wherein:
the belt is guided by the belt pulleys mounted to the moving bodies and the fixing body, and
one end of the belt is connected to the fixing body through a first fixing member, and another end of the belt is connected to the up and down moving member through a second fixing member.

17. The inspection apparatus of claim 12, further comprising a stopping unit disposed on the forward and rearward moving member movable to the front and rear directions for selectively limiting movement of the up and down moving member.

18. The inspection apparatus of claim 17, wherein the stopping unit comprises a stopping bar which is movable along a second guide rail disposed on the forward and rearward moving member and selectively limits movement of the connecting bracket.

19. The inspection apparatus of claim 18, wherein the stopping bar is disposed along an upward direction and of which an end selectively limits movement of the connecting bracket.

20. The inspection apparatus of claim 18, further comprising a stopping cylinder disposed on the forward and rearward moving member for selectively moving the stopping bar to the front and rear directions.

* * * * *